(12) United States Patent
Reinhart et al.

(10) Patent No.: US 8,245,685 B2
(45) Date of Patent: Aug. 21, 2012

(54) LUBRICATION AND SEALING SYSTEM FOR INTERNAL COMBUSTION ENGINE

(75) Inventors: Paul T. Reinhart, Livonia, MI (US); Mark Brenkus, Dearborn Heights, MI (US); Ken Fedeson, Farmington Hills, MI (US)

(73) Assignee: Ford Global Technologies, Dearborn, MI (US)

( * ) Notice: Subject to any disclaimer, the term of this patent is extended or adjusted under 35 U.S.C. 154(b) by 645 days.

(21) Appl. No.: 12/492,205

(22) Filed: Jun. 26, 2009

(65) Prior Publication Data

US 2010/0326393 A1    Dec. 30, 2010

(51) Int. Cl.
*F16J 15/00* (2006.01)
(52) U.S. Cl. .......... 123/196 R; 123/90.33; 277/591
(58) Field of Classification Search .......... 123/196 R, 123/90.33–90.37; 184/6.5–6.9; 277/313, 277/591, FOR. 248
See application file for complete search history.

(56) References Cited

U.S. PATENT DOCUMENTS

| | | | |
|---|---|---|---|
| 4,211,205 A | 7/1980 | Lockhart | |
| 4,683,844 A | 8/1987 | Arai et al. | |
| 4,944,265 A | 7/1990 | Davey | |
| 5,267,740 A | 12/1993 | Stritzke | |
| 5,853,175 A | 12/1998 | Udagawa | |
| 6,305,420 B1 * | 10/2001 | Atkinson et al. | 137/846 |
| 6,588,766 B2 | 7/2003 | Shattuck | |
| 6,786,490 B2 | 9/2004 | Fujino et al. | |
| 6,901,891 B2 | 6/2005 | Suzuki et al. | |
| 7,044,099 B2 | 5/2006 | Gorgas et al. | |
| 7,152,571 B1 | 12/2006 | Wilson et al. | |
| 2002/0024183 A1 | 2/2002 | Thompson | |
| 2008/0245613 A1 | 10/2008 | Rutschmann et al. | |

FOREIGN PATENT DOCUMENTS

| | | | |
|---|---|---|---|
| EP | 2050990 A1 | | 4/2009 |
| JP | 05052108 A | * | 3/1993 |
| WO | WO2007/096032 A1 | | 8/2007 |

* cited by examiner

*Primary Examiner* — Noah Kamen
(74) *Attorney, Agent, or Firm* — Jerome R. Drouillard; Julia Voutyras

(57) ABSTRACT

A sealing and lubrication system includes first and second machine components with a combination sealing and lubrication directing gasket mounted between the first and second machine components. The gasket includes a sealing portion extending between the components and a nozzle portion which is operatively connected with the sealing portion as well as with a lubrication supply passage. The nozzle portion extends from the sealing portion of the gasket to a region external to the first machine component and the second machine component. The nozzle provides lubricating oil to at least one moving part of a third machine component.

10 Claims, 2 Drawing Sheets

LUBRICATION AND SEALING SYSTEM FOR INTERNAL COMBUSTION ENGINE

BACKGROUND OF THE DISCLOSURE

1. Field of the Disclosure

The present disclosure relates to a combination sealing and lubrication directing gasket for use in a machine such as an internal combustion engine.

2. Related Art

Machines such as internal combustion engines, which are assembled with relatively rigid parts having gaskets clamped therebetween, often utilize pressure lubrication, so as to provide lubrication not only at higher pressure to bearings, but also at pressures approaching atmospheric pressure to components such as gear drives and chain drives commonly employed, for example, to power the cylinder valve operating gear of an engine. Provision of this type of spray lubrication is frequently provided by means of a discrete nozzle which is mounted to a cylinder block or cylinder head and directed into the case of an engine, often behind a front cover, so as to provide lubrication to the engine's valve drive system. Known nozzles require special machining in order to provide a threaded hole for mounting the nozzle, and perhaps a second hole to prevent the nozzle from rotating in an undesired manner. These added parts and machining operations add undesirable cost, weight, and complexity to the engine or other machine.

It would be desirable to provide a gasket, such as a cylinder head gasket which performs not only a sealing function, but also has an integral capability to provide directed spray lubrication to one or more parts of an engine or other machine.

SUMMARY OF THE DISCLOSURE

According to an aspect of the present disclosure, a sealing and lubrication system includes a first machine component, a second machine component attached to the first machine component, and a combination sealing and lubrication directing gasket including a sealing portion extending between the first machine component and the second machine component, and a nozzle portion, operatively connected with the sealing portion and with a lubrication supply passage, with the nozzle portion extending from the sealing portion to a region external to the first machine component and the second machine component, and with the nozzle portion providing lubricating oil to at least one moving part of a third machine component.

According to another aspect of the present disclosure, the nozzle portion may be configured as a passage having a number of walls, but with at least one of the walls being one-piece with the sealing portion of the combination gasket.

According to another aspect of the present disclosure, an internal combustion engine may include a cylinder block, a cylinder head attached to the cylinder block, and a cylinder head gasket extending between the cylinder block and the cylinder head, with the cylinder head gasket including a lubrication passage, an inlet port for admitting lubricant into the lubrication passage, and an outlet port for directing lubricant leaving the lubrication passage onto a component of the engine.

According to another aspect of the present disclosure, the lubrication passage which is part of the present system is configured as a generally rectangular passage having a lower wall defined by a base gasket layer which contacts the cylinder block of an engine, and which contains an inlet port, with the lubrication passage having an upper wall defined by an upper gasket layer contacting the cylinder head of an engine, as well as sidewalls defined by a middle gasket layer having a slot extending from the inlet port to the outlet port. The outlet port is preferably configured as a nozzle.

According to another aspect of the present disclosure, at least a portion of the lubrication passage is cantilevered outwardly from the cylinder block and cylinder head of an engine.

According to another aspect of the present disclosure, the lubricant supply passage includes an engine oil passage configured within either the cylinder block or cylinder head of the engine.

It is an advantage of a lubrication and sealing system according to the present disclosure that lubricant may be provided to a portion of an engine, for example, outlying the cylinder head and cylinder block, with an extension of the cylinder head gasket, and without the need for any additional componentry.

It is another advantage of a lubrication and sealing system according to the present disclosure that additional cost is avoided by eliminating the need for machining operations such as boring, drilling and tapping which would otherwise be required for mounting an oil nozzle to a pressure lubrication system of a machine such as an engine.

Other advantages, as well as features of the present system, will become apparent to the reader of this specification.

DETAILED DESCRIPTION OF THE PREFERRED EMBODIMENTS

Figure 1:
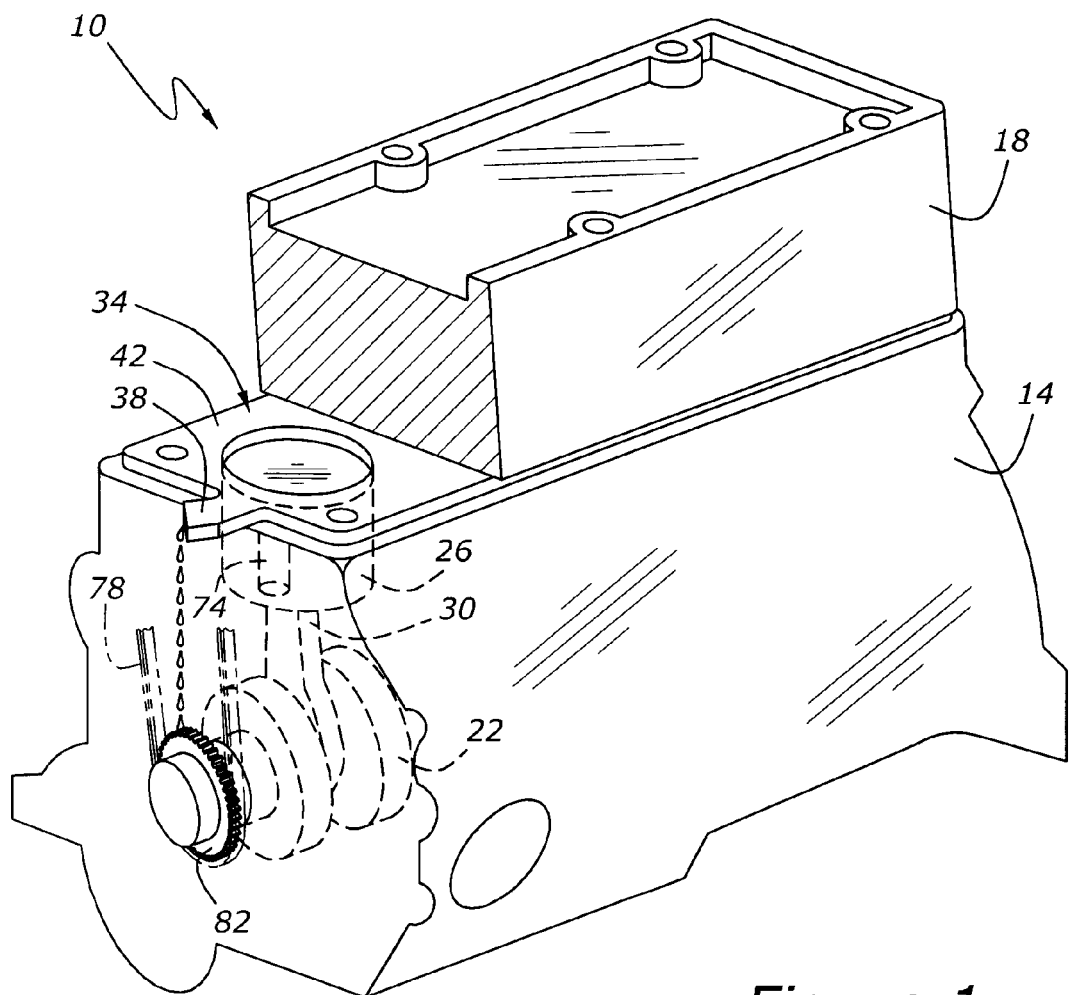
FIG. 1 is a partially schematic perspective view of an engine having a lubrication and sealing system according to the present disclosure.

As shown in FIG. 1, an engine, 10, has a cylinder block 14, and a cylinder head 18. Crankshaft 22 and piston and connecting rod 26 and 30 are mounted within cylinder block 14. A cylinder head gasket, 34, extends between cylinder block 14 and cylinder head 18. A lubrication passage 74 (FIG. 1) is located near the front of cylinder block 14, and provides oil under pressure from an oil pump (not shown), of the type usually employed in internal combustion engines for providing higher pressure oil to the engine's bearings and other wear surfaces. If desired, a source of higher pressure oil may be configured as an oil passage within cylinder head 18, as an alternative to illustrated oil passage 74. Gasket 34 has a nozzle portion, 38, which is cantilevered outwardly from cylinder block 14 and cylinder head 18, and which provides lubrication to a timing chain, 78, as well as to a crankshaft sprocket, 82.

Figure 2:
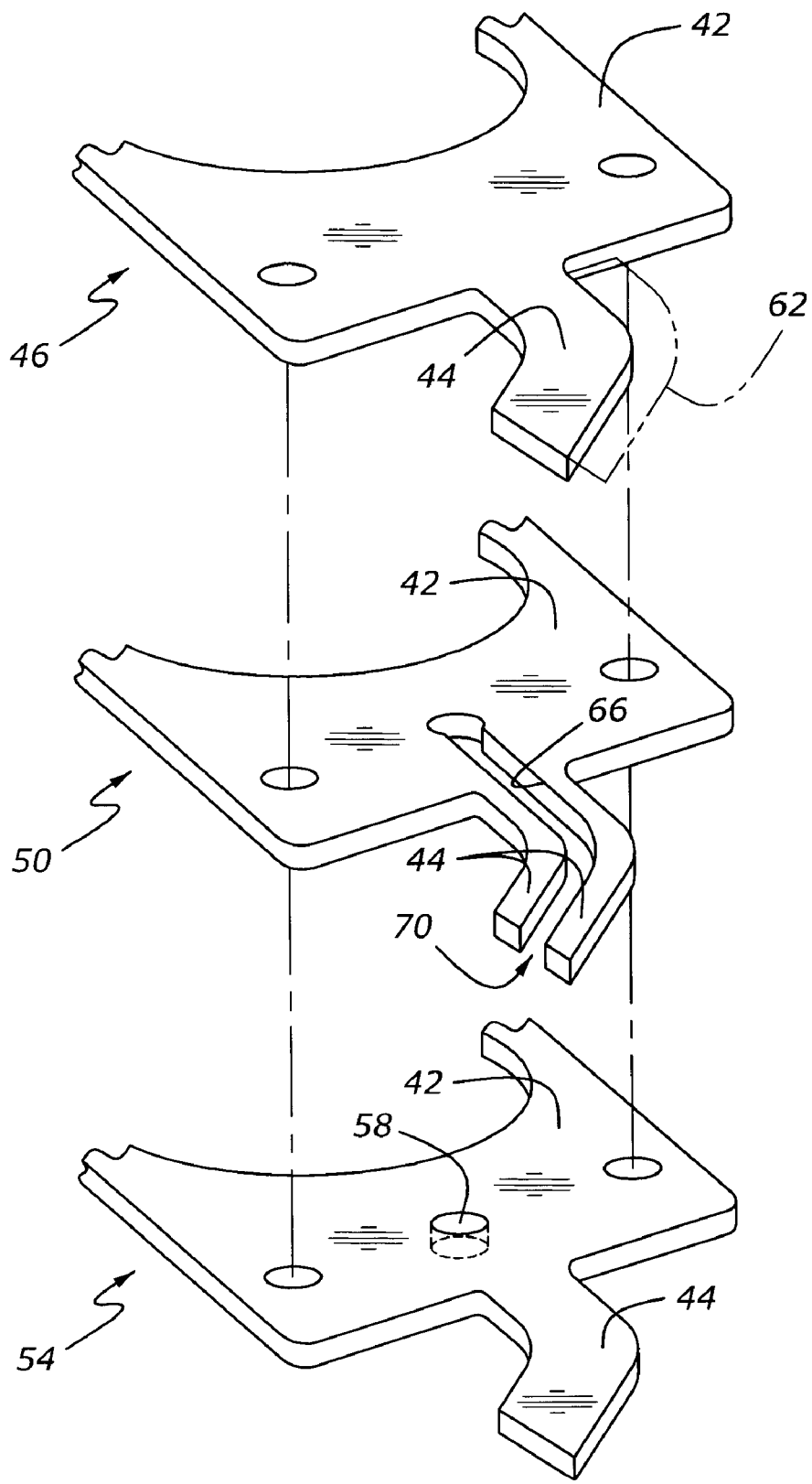
FIG. 2 illustrates three layers of a gasket constructed according to an aspect of the present disclosure.

Turning now to FIG. 2, the multilayer construction of the present lubrication and sealing system is shown. Upper gasket layer 46 has a sealing portion, 42, and a nozzle portion, 44, which corresponds to the nozzle portion of the gasket, 38, shown in FIG. 1. Base gasket layer, 54, has an area devoted to sealing portion 42, and nozzle portion 44. Base gasket layer 54 also has an inlet port 58, which matches up with oil passage 74 formed in cylinder block 14.

Middle gasket layer 50 has a slot, 66, which cooperates with upper gasket layer 46 and base gasket layer 54 to define a lubrication passage which is configured as a generally rectangular passage having a lower wall defined by base gasket layer 54, which contacts cylinder block 14, and which contains inlet port 58, and with the lubrication passage also having an upper wall defined by upper gasket layer 46 which, of course, contacts cylinder head 18. In essence, slot 66 within middle gasket layer 50 defines sidewalls 44 of a lubrication passage which terminates with open end 70.

The three layers of gasket 34 are preferably formed from metallic, non-metallic or composite materials which may be joined to achieve sealing therebetween, and also sealing of nozzle portion 38. For this purpose, a foldover tab, 62, may be provided on one of the gasket layers, such as tab 62 shown on upper gasket layer 46, to allow the nozzle to be constructed in a satisfactory manner. In the event that layers 46, 50 and 54 are configured from a work hardenable material such as mild steel, nozzle portion 38 may be accurately placed or directed during building of engine 10, so as to apply oil to timing chain 78 and crankshaft sprocket 82. Note that the establishment of the direction for oil being discharged by nozzle portion 38 may be accomplished without the need for any fasteners or additional bonding or components other than those provided integrally with head gasket 34. Also, because nozzle portion 38 includes one-piece upper and lower walls provided by upper gasket layer 46, and base gasket layer 54, respectively, fewer additional parts are needed, as are fewer additional manufacturing steps. This in turn results in less cost, weight, and complexity for the present system as compared with known spray lubrication systems.

The foregoing system has been described in accordance with the relevant legal standards, thus the description is exemplary rather than limiting in nature. Variations and modifications to the disclosed embodiments may become apparent to those skilled in the art and fall within the scope of the disclosure. Accordingly, the scope of legal protection can only be determined by studying the following claims.

What is claimed is:

1. An internal combustion engine, comprising:
  a cylinder block;
  a cylinder head attached to said cylinder block; and
  a cylinder head gasket extending between said cylinder block and said cylinder head, with said cylinder head gasket comprising:
  a lubrication passage;
  an inlet port for admitting lubricant into said lubrication passage; and
  an outlet port for directing lubricant leaving said lubrication passage onto a component of the engine, wherein said lubrication passage is configured as a generally rectangular passage having a lower wall defined by a base gasket layer which contacts said cylinder block and which contains said inlet port, and with said lubrication passage having an upper wall defined by an upper gasket layer contacting said cylinder head, as well as side walls defined by a middle gasket layer having a slot extending from said inlet port to said outlet port.

2. An internal combustion engine according to claim 1, wherein said outlet port directs lubricant onto at least a portion of a cylinder valve operating system.

3. An internal combustion engine according to claim 1, wherein at least a portion of said lubrication passage is cantilevered outwardly from said cylinder block and said cylinder head.

4. An internal combustion engine according to claim 1, wherein at least a portion of said lubrication passage containing said outlet port is cantilevered outwardly from said cylinder block and said cylinder head.

5. An internal combustion engine according to claim 1, wherein said base gasket layer, said upper gasket layer, and said middle gasket layer comprise metal members.

6. An internal combustion engine according to claim 1, wherein said outlet port is configured as a nozzle.

7. An internal combustion engine, comprising:
  a cylinder block;
  a cylinder head attached to said cylinder block; and
  a cylinder head gasket, comprising:
  a sealing portion extending between said cylinder block and said cylinder head; and
  a nozzle portion, operatively connected with said sealing portion and with a lubrication supply passage, with said nozzle portion extending from said sealing portion to a region external to said cylinder block and said cylinder head, with said nozzle portion providing lubricating oil to at least one moving part of the engine, wherein said sealing portion of said cylinder head casket comprises an upper gasket layer in contact with said cylinder head, a base gasket layer in contact with said cylinder block, and a middle layer, with said nozzle portion having an upper wall which is one-piece with said upper gasket layer, and a lower wall which is one-piece with said base gasket layer.

8. An internal combustion engine according to claim 7, wherein said lubrication supply passage comprises an engine oil passage configured within said cylinder block.

9. An internal combustion engine according to claim 7, wherein said lubrication supply passage comprises an engine oil passage configured within said cylinder head.

10. An internal combustion engine according to claim 7, wherein said middle layer has an open-ended slot defining two side walls of said nozzle portion, and with said open-ended portion of said slot further defining an outlet port for directing lubricating oil upon said at least one moving part of the engine.

* * * * *